United States Patent [19]

McCoy

[11] 4,341,814

[45] Jul. 27, 1982

[54] PEANUT BUTTER STABILIZER

[75] Inventor: Stephen A. McCoy, Villa Hills, Ky.

[73] Assignee: The Procter & Gamble Company, Cincinnati, Ohio

[21] Appl. No.: 200,123

[22] Filed: Oct. 24, 1980

[51] Int. Cl.[3] .............................................. A23D 5/00

[52] U.S. Cl. .................................... 426/607; 426/633

[58] Field of Search ........................ 426/603, 607, 633

[56] References Cited

U.S. PATENT DOCUMENTS

| | | | |
|---|---|---|---|
| 3,127,272 | 3/1964 | Baker et al. | 426/633 X |
| 3,129,102 | 4/1964 | Sanders | 426/633 X |
| 3,265,507 | 8/1966 | Japikse | 426/633 X |
| 3,278,314 | 10/1966 | Colby et al. | 426/633 X |
| 3,671,267 | 6/1972 | Gooding et al. | 426/633 X |
| 3,821,448 | 6/1974 | Parker et al. | 426/633 X |

*Primary Examiner*—Robert A. Yoncoskie

*Attorney, Agent, or Firm*—Rose Ann Dabek; Julius P. Filcik; Richard C. Witte

[57] ABSTRACT

Disclosed is a peanut butter stabilizer composition comprising (1) an intermediate melting fat fraction having an iodine value of from 25 to 45 and a solids content of between 80% and 95% at a temperature of from 50° F. to 90° F. and a solids content of less than 50% at 115° F., and (2) a hydrogenated oil component comprising a triglyceride having a high proportion of $C_{20}$-$C_{22}$ fatty acids and, optionally, a second hydrogenated oil, the hydrogenated oil component having an iodine value of less than 8. The use of this stabilizer improves the texture of peanut butter, increases the mouthmelt, and reduces the stickiness often caused by the use of a stabilizing component.

14 Claims, No Drawings

PEANUT BUTTER STABILIZER

FIELD OF THE INVENTION

This invention relates to peanut butter stabilizers suitable for preventing the separation of oils from peanut butter. These stabilizers improve the texture of the peanut butter and reduce the stickiness, and provide a fluid consistency over the normal range of temperatures encountered, about 50° F. to about 100° F.

BACKGROUND OF THE INVENTION

Conventional peanut butters consist of a mixture of solid nut particles, liquid oil, and in general, sugar and salt. The peanut butter is made by roasting and blanching raw peanut kernels and then grinding them. The comminuted nut particles are suspended in the oil to form a product having a pasty and spreadable consistency. In time, however, the oil will separate from the product and form a separate layer on the top and a rigid crumbly mass underneath. This tendency of peanut butter to separate on standing can be overcome to some extent by the use of suitable stabilizers such as by incorporating in the peanut butter partially hydrogenated or highly hydrogenated fats and oils.

It is known that the addition of these hydrogenated fats and oils stabilize the peanut butter by forming a crystal matrix which lends rigidity to the mass and prevents settling of peanut particles. However, to obtain the desired texture at high temperatures (80°-100° F.) these additives generally have high melting points (between 110° F. and 150° F.). When these high melting materials are added to the peanut butter in a quantity large enough to stabilize the oil, the peanut butter becomes excessively firm at the ordinary temperatures of use. As a result, the product is difficult to spread, has a waxy taste, slow mouthmelt, and tends to cling to the roof of the mouth when it is eaten.

The delicate balance required to prevent oil separation without sacrificing too much low temperature spreadability and without incurring a waxy mouth impression is difficult to obtain.

Another disadvantage of the use of the hydrogenated fat stabilizer is the wide variance of product quality which results from the variations in temperature during processing. In grinding peanuts to make peanut butter the temperature of the product increases to about 160° F. or higher. The stabilizing material is added during the grinding step or while the product is at an elevated temperature. In common commercial practice the product is then rapidly chilled, customarily using a device such as a scraped wall heat exchanger to a temperature below the freezing point of at least a portion of the fat solids present in the product. The heat exchanger outlet temperatures may range from as low as 70° F. to as high as about 120° F. Variations in this outlet temperature frequently occur during the manufacturing, and may vary substantially within a day.

Wide variations in product quality can also be caused by variations in mechanical agitation of the partially formed crystal matrix during chilling. Any physical working of peanut butter stabilized by hydrogenated fat after it is chilled but, prior to the time it is packaged, will influence greatly the firmness and degree of stabilization of the peanut butter.

The manufacturing variance problems are minimized by the use of a stabilizer consisting of hydrogenated rapeseed oil having an iodine value not greater than 10. See U.S. Pat. No. 3,129,102 issued to Sanders (1964). U.S. Pat. No. 3,265,507 issued to Japikse (1966) discloses a peanut butter stabilizer which provides improved flavor. This stabilizer is a mixture of a beta phase tending hardstock and a non-beta phase tending hardstock. The preferred mixture is a mixture of hydrogenated soybean oil and hydrogenated rapeseed oil. However, because the melting points of these additives are high, the resulting peanut butter does not give a rapid mouthmelt, and tends to be stiffer at the lower use temperatures, in the region of 50° F.

An object of the present invention is to produce a peanut butter which has good mouthmelt properties and reduced stickiness.

Another object of this invention is to provide a peanut butter of improved texture, i.e. less stiff and waxy without sacrificing stability.

DESCRIPTION OF THE INVENTION

The peanut butter stabilizer system of this invention comprises:

(a) an intermediate melting fat having an IV of 25 to 45 and a solids content of from about 80% to about 95% at temperatures of from 50° F., and a solids content of less than 50% at 115° F.;

(b) a hydrogenated fat or oil having an IV of not greater than 10, said fat or oil having a high proportion of fatty acids having from 20 to 24 carbon atoms.

The iodine value (IV) of an oil or fat indicates the number of grams of iodine equivalent to the halogen adsorbed by a 100 g. sample. In general, the lower the iodine value of a given fat or oil, the greater will be its content of solids at a given temperature. That is, as the triglyceride molecules become more saturated by the addition of hydrogen (i.e. the double bond content decreases), the consistency of the fat or oil becomes more solid. The iodine value can be readily determined by the well-known Wijs method.

A reasonably accurate approximation of the percent by weight of solids in the sample of fat or oil at any given temperature can be determined by a pulsed nuclear magnetic resonance method as described in Madison and Hill, *J. Amer. Oil Chem. Soc.*, 55, 328-331 (1978). The approximation of the solids content of the sample according to this method is stated in terms of a S.C.I. (solids content index). The less solids the fat contains at 50° F., the more spreadable is the peanut butter. On the other hand, there must still be sufficient solid fat content at 100° F. if oil separation is to be avoided. Thus, the higher the SCI value at about 100° F., the better is the tendency of the peanut butter containing the oils to resist oil separation. However, mouthmelt is also sacrificed.

The amount of stabilizer should range from about 1% to about 4%, by weight of peanut butter, and preferably from about 1.5% to about 3.5%, most preferably from 2% to 3%. If less than about 1% of the stabilizer is present the peanut butter will have an undesirable amount of oil separation due to insufficient stabilization when the product is stored at room temperature. If more than about 4% of the stabilizer is used, the product will be too firm and will have a waxy taste.

The intermediate melting fat fraction of the stabilizer is prepared by hydrogenating a triglyceride fat oil to an iodine value of from about 25 to about 45, preferably from about 30 to 40. The triglyceride oil should be hydrogenated under conditions such that the intermediate melting fat which is produced has a solid content of from about 80% to about 95% at temperatures of from 50° F. to 90° F. The solids content should decrease rapidly to about 35% to about 50% at 115° F.

INTERMEDIATE MELTING FAT

The intermediate melting fat should typically have a solids content as enumerated below:

| Temperature | % Solids |
|---|---|
| 50° F. | 85-95 |
| 60° F. | 85-95 |
| 70° F. | 85-95 |
| 80° F. | 82-92 |
| 100° F. | 65-75 |
| 105° F. | 55-65 |
| 115° F. | 35-50 |

Triglyceride oils which can be hydrogenated to yield an intermediate melting fat are soybean oil, palm oil, cottonseed oil, peanut oil, and coconut oil. Rearranged fats or oils prepared by interesterification can also be used herein. Synthetic fats or oils are also useful so long as they meet the solids content criteria.

Preferred intermediate melting fractions are cottonseed oil, hydrogenated to an iodine value of about 36, and blends of soybean oil and palm oil, the ratio of soybean oil to palm oil being in the range of from about 80:20 to about 60:40. These oils are blended to an IV of about 35.

The substantially completely hydrogenated triglyceride (fat or oil hardstock) of the stabilizer should have an iodine value not exceeding about 10. The hydrogenated fat or oil is formulated to consist essentially of a hydrogenated fat and oil having a high proportion of fatty acids containing 20 to 24 carbon atoms such as hydrogenated rapeseed oil, mustard seed oil, salmon oil, herring oil, pilchard oil, menhaden oil, and sardine oil. The highly preferred hardstock component herein is hydrogenated rapeseed oil. This portion of the hardstock component having the high proportion of fatty acids having 20 to 24 carbon atoms is a non-beta phase tending hardstock.

Optionally, a second hardstock component can be added to the stabilizer. It is derived from substantially completely hydrogenated fats and oils such as lard, sunflower seed oil, cottonseed oil, safflower seed oil, linseed oil, sesame seed oil, hazelnut oil, palm oil, soybean oil, peanut oil, olive oil, and corn oil. Highly preferred for use herein is hydrogenated cottonseed oil having an iodine value of about 4. This second component is added to the hardstock having a high proportion of $C_{20}$-$C_{24}$ fatty acids in the ratio of 3:1 to 1:3.

The stabilizer system should contain a blend of the intermediate melting fat and the hydrogenated fat or oil component in the ratio of 4:1 to 1:1.5 (intermediate melting fat to hydrogenated fat or oil), preferably from about 3:1 to 1:1.2.

Other additives such as salt, emulsifiers, and sweetening agents such as sucrose, dextrose, corn syrup, molasses and honey, can also be present in the peanut butter.

A typical peanut butter composition includes:

| | Percent by wt. |
|---|---|
| Peanuts | 80 to 90 |
| Peanut oil | 0 to 10 |
| Salt | 0 to 2 |

-continued

| | Percent by wt. |
|---|---|
| Sweetener | 1 to 7 |
| Emulsifier | 0 to 3 |
| Stabilizer | 1 to 4 |
| A. Intermediate melting fat | 1 to 3 |
| B. ($C_{20}$—$C_{24}$) hydrogenated fat | 0.5 to 1.5 |
| Hydrogenated fat, IV 10 | 0 to 1.5 |

The peanut butter can be prepared by conventional methods such as roasting and then grinding the peanuts. Likewise, the stabilizer can be introduced into the peanut butter by known processes. These include adding it to the nuts in the grinding equipment, or thoroughly and homogeneously dispersing it in the hot ground peanut butter. Preferably, the stabilizer should be in melted form when added to the peanut butter. Other additives are commonly admixed during or following the grinding step. The peanut butter is then chilled to a temperature sufficiently low so that some fat solids will form to produce a crystal matrix. Preferably this temperature should be below about 140° F.

It is understood, however, that the invention is not to be limited to any particular manner of making peanut butter or introducing the stabilizer.

A suitable test for determining the relative consistency of peanut butter is the penetration test. The penetration test is done with the aid of a grease penetrometer according to A.S.T.M. Method D217-52T. Penetration values are obtained by placing a standard grease cone on the surface of the sample to be penetrated and measuring the number of hundredths of a millimeter the cone penetrates the sample in 10 seconds. The peanut butter is tested for consistency as determined by penetration after the temperature of the sample is brought to 70° F. when it has been stored at higher or lower temperatures. For purposes of this invention, a precision scientific A.S.T.M. penetrometer with a 47 g. cone on a 9" shaft, the cone measuring 2"×19/32", was used. Using this instrument, the desired range for penetration is between about 200 and about 300, preferably between 240 and 280.

The following examples illustrate a typical preparation of the improved peanut butter of the invention. The examples are meant to be illustrative and the invention, of course, is not to be limited thereto. Percentages expressed below are in terms of weight percent unless otherwise indicated.

EXAMPLE I

Peanuts were roasted, blanched and cleaned to remove all debris. The peanuts were then fed into a peanut butter mill consisting of two vertical parallel circular plates, one fixed and one rotating. The inner surfaces of the plates were equipped with burs or teeth with a small clearance between the plates. The peanuts were fed into the center of the plates and were forced out the sides in the form of a fine peanut particles and oil. In separate runs various stabilizers in ground solid form, each with about 0.4% emulsifier, about 1% salt and 5.5% sugar, by weight of the final peanut butter, were mixed with the peanut paste after milling. The ground product of a temperature of about 160° F. was fed into a recirculating system to thoroughly mix the ingredients.

The peanut butter with stabilizer is then fed into a Matten-Gualin homogenizer where it is further ground to finely divide the peanuts, salt and sugar. During this grinding step the temperature rises to about 180° F. The peanut butter is then passed through a scraped wall chiller in which it is rapidly cooled down to temperatures between 90° and 100° F. Immediately following this freezing step, the product is gently agitated and placed into jars and stored at temperatures within the range of 50° F. to 90° F.

The following stabilizer systems were used:

| | Stabilizer | % by wt. final product |
|---|---|---|
| A. | % Cottonseed (IV 36) | 2.2 |
| | Cottonseed hardstock | 0.35 |
| | Rapeseed hardstock | 0.35 |
| B. | Cottonseed (IV 36) | 1.0 |
| | Cotonseed hardstock | 0.55 |
| | Rapeseed hardstock | 0.55 |
| C. | 70/30 soy/palm (IV 35) | 2.2 |
| | Rapeseed hardstock } Soybean hardstock | 0.7 |
| D. | Rapeseed hardstock | 1.8% |
| | Soybean hardstock | |

When 99 panelists were asked to compare products A and D, product A was preferred by 76 for being less sticky, by 79 for creaminess and by 81 for faster melting.

When product C was compared with product D by a panel of consumers, C was preferred 55% to 25% (rest no preference) for creaminess, 43% to 18% (rest no preference) for less sticky, and 45% to 15% (rest no preference) for faster mouthmelt.

C was also compared to a commercial creamy peanut butter. Again it was preferred for creaminess 53% to 22% (rest are no preference) for less sticky 30% to 19% (rest are no preference) and for mouthmelt 30% to 19% (rest are no preference).

When product B was compared to product D, B was preferred by 60% of the panelists for texture, which is a measure of mouthmelt, stickiness and creaminess.

What is claimed is:

1. A peanut butter stabilizer composition comprising:

(a) an intermediate melting fat fraction having an IV of from about 25 to about 45 and a solid content of between 80% and 95% at temperatures of from 50° F. to 90° F., and a solid content below 50% at 115° F.; and (b) a hydrogenated oil fraction having an IV of less than 10, which comprises a substantially completely hydrogenated fat and oil having a high proportion of fatty acids containing 20 to 24 carbon atoms;

wherein the ratio of the intermediate melting fat fraction to the hydrogenated oil fraction is from 4:1 to 1:1.5.

2. A peanut butter stabilizer according to claim 1 wherein the intermediate melting fat has an iodine value of from about 30 to 40.

3. A stabilizer according to claim 1 wherein the intermediate melitng fat is derived from a blend of soybean oil and palm oil wherein the ratio of soybean oil to palm oil is from 80:20 to about 60:40.

4. A stabilizer according to claim 3 wherein the iodine value of the intermediate melting fat is about 35.

5. A stabilizer according to claim 4 wherein the hydrogenated oil fraction comprises hydrogenated rapeseed oil.

6. A stabilizer according to claim 5 wherein the hydrogenated oil fraction comprises a mixture of hydrogenated rapeseed oil and hydrogenated soybean oil having an iodine value of about 4.

7. A stabilizer according to claim 1 having the intermediate melting fraction is cottonseed oil hydrogenated to an iodine value of about 36.

8. A stabilizer according to claim 7 wherein the hydrogenated oil fraction comprises hydrogenated rapeseed oil.

9. A stabilizer according to claim 8 wherein the hydrogenated oil fraction comprises a mixture of hydrogenated rapeseed oil and hydrogenated cottonseed oil having an iodine value of about 4.

10. A peanut butter composition comprising:

(a) from about 90 to about 99.5% peanuts and peanut oil;

(b) from about 1% to about 4% of a peanut butter stabilizer composition according to claim 1.

11. A peanut butter according to claim 10 which additionally contains salt, sweeteners and emulsifier.

12. A peanut butter according to claim 11 wherein the intermediate melting fat of the peanut butter stabilizer composition has an iodine value of from about 30 to 40.

13. A peanut butter according to claim 11 wherein the intermediate melting fat of the peanut butter stabilizer composition comprises cottonseed oil having an iodine value of about 36.

14. A peanut butter composition comprising:

(a) from about 90% to about 99.5% peanuts and peanut oil;

(b) from about 1% to about 4% of a peanut butter stabilizer composition according to claim 9.

* * * * *